United States Patent [19]

Lundell

[11] 4,019,309
[45] Apr. 26, 1977

[54] ROUND BALE FORMING MACHINE

[76] Inventor: Vernon J. Lundell, P.O. Box 171, Cherokee, Iowa 51012

[22] Filed: Mar. 5, 1976

[21] Appl. No.: 664,344

[52] U.S. Cl. .................................. 56/341
[51] Int. Cl.² .......................... A01D 39/00
[58] Field of Search ............. 56/341–343, 56/1, DIG. 2, 16.4

[56] References Cited

UNITED STATES PATENTS

| | | | |
|---|---|---|---|
| 3,792,574 | 2/1974 | Best | 56/341 |
| 3,815,344 | 6/1974 | Kucera | 56/341 |
| 3,969,879 | 7/1976 | Seymour | 56/341 |

Primary Examiner—Russell R. Kinsey
Attorney, Agent, or Firm—Henderson, Strom & Sturm

[57] ABSTRACT

A round bale forming machine having a drum for picking up and rolling the windrowed hay into a round bale, at least one roller movably mounted in the machine for compacting and forming the bale, and a laterally mounted comb disposed behind the drum for picking up hay missed by the drum and for depositing that hay on the drum wherein it is placed onto the forming bale.

9 Claims, 8 Drawing Figures

ROUND BALE FORMING MACHINE

BACKGROUND OF THE INVENTION

The baling of hay is one way of storing and preserving hay. Without baling, the hay is at the mercy of the elements to be dispersed, is hard to handle for transportation purposes, and is bulky for storage purposes. By baling hay, these problems have been greatly alleviated.

There are various types of baling machines available, each suited for various purposes. There's the rectangular baler which forms small rectangular bales, the stack type of baler which forms large stack bales, and the round baler which forms large round bales.

The round baler has some very distinct advantages. The first is that the bales may be varied as to size, from a very small bale to one of a very large size. Also, with the round baler, the bales may be so tightly wrapped that they may be near weather resistant which would cut down on the amount of waste. Also, due to the compactness of the bale, when stored outside in various weather conditions, the possibility of the elements scattering the hay is greatly reduced. Another advantage is that the baling process is a one man operation. Also, after the bale is formed, the transportation of the bale to the feed area or storage area is quite easy.

The round balers on the market today are of various constructions, many having a plurality of complex moving parts which increases the cost of the baler initially, they are costly to repair, and due to the complexity of the machines, most farmers can't repair the machine.

Many of these balers offer a bale transportation feature by utilizing a platform on which the bale is formed. By utilizing a platform, the hay must be picked up from the ground and placed upon the platform; thus, leading to the problem of leaving hay in the field. Also, to move the hay from the front of the baler to the rear were the bale is formed involves moving teeth or chain drives which tend to break the shafts of the hay, grind the hay, and thereby clog the machine.

Another problem arising from the use of the round baler is the amount of windrowed hay which is missed by the pickup drum or teeth; this hay may either be right at the edge of the windrow and therefore be missed by the pickup drum or it may be in the windrow and not picked up because of the design of the pickup drum.

It has also been found that balers which roll the bale on the ground must have the roller speed identical or substantially identical to the ground speed of the baler. Any other roller speed tends to permit the tines on the roller to tear the hay of the forming bale and thus cause packing problems around the area of the roller.

The present invention is designed to alleviate or eliminate the problems outlined above.

SUMMARY OF THE INVENTION

This invention relates to a hay baler, and in particular to a baler for forming cylindrical or round bales; the baler has a frame, a rearward disposed rotating drum having teeth secured thereto, lifting arms secured between the frame and the drum for lifting the drum to release or discharge a bale from the baler, cleaning bands secured to the lifting arms for cleaning hay from the drum, a roller device secured to the lifting arms for compacting the hay and for forming the bale, spring biased bands coacting with the drum for compacting and forming the bale, a comb mounted rearwardly of the drum for picking up hay missed by the drum and for directing that missed hay back into the baler, and windrowing wheels mounted on the forward end of the baler to move hay on the ground into the baler.

An object of this ivnention is to provide a baler for forming round bales which utilize a roller disposed in the baler to compact and form a bale.

Another object of this invention is to provide a baler that incorporates a trailing comb to pick up missed hay and to deposit that hay back in the baler.

Yet another object of this invention is the provision of a baler which utilizes windrowing wheels on the forward end of the baler to move hay into a narrow windrow.

Another object of this invention is the provision of a round baler wherein the degree of compaction of the hay in the bale can be varied.

Still another object of this invention is the provision of a round baler wherein no moving bands or chains are required to form the bale.

A further object of this invention is the provision of a baler having a mechanism which provides that the speed of the roller is substantially identical to the forward speed of the baler.

A still further object of this invention is to provide an improved twine wrapping device for a baler.

Yet a further object of this invention is to have a hay baler that is rugged in construction, economical to manufacture, easily repaired, and extremely effective in use.

The objects and other features and advantages become more readily apparent upon reference to the following description when taken in conjunction with the appended drawings.

BRIEF DESCRIPTION OF THE DRAWINGS

In the drawings as hereinafter described, one embodiment of the invention is illustrated, however, various modifications can be made thereto without departing from the true spirit and scope of the invention.

DESCRIPTION OF THE PREFERRED EMBODIMENT

Figure 1:
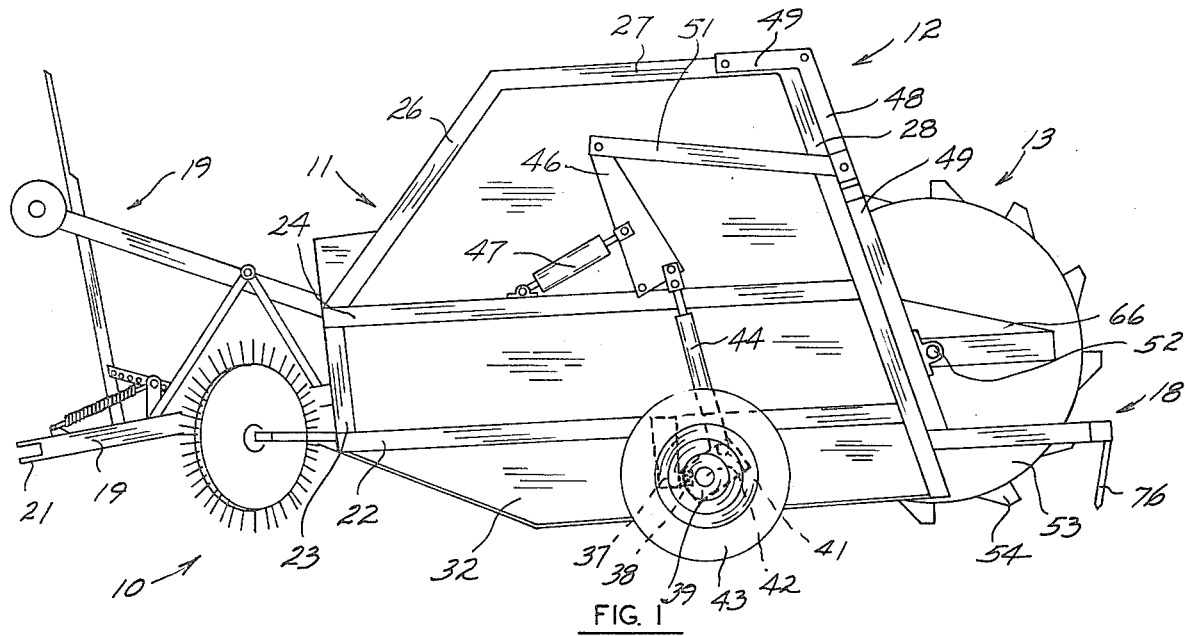
FIG. 1 is a side elevational view of the improved ROUND BALE FORMING MACHINE of this invention.
Figure 4:
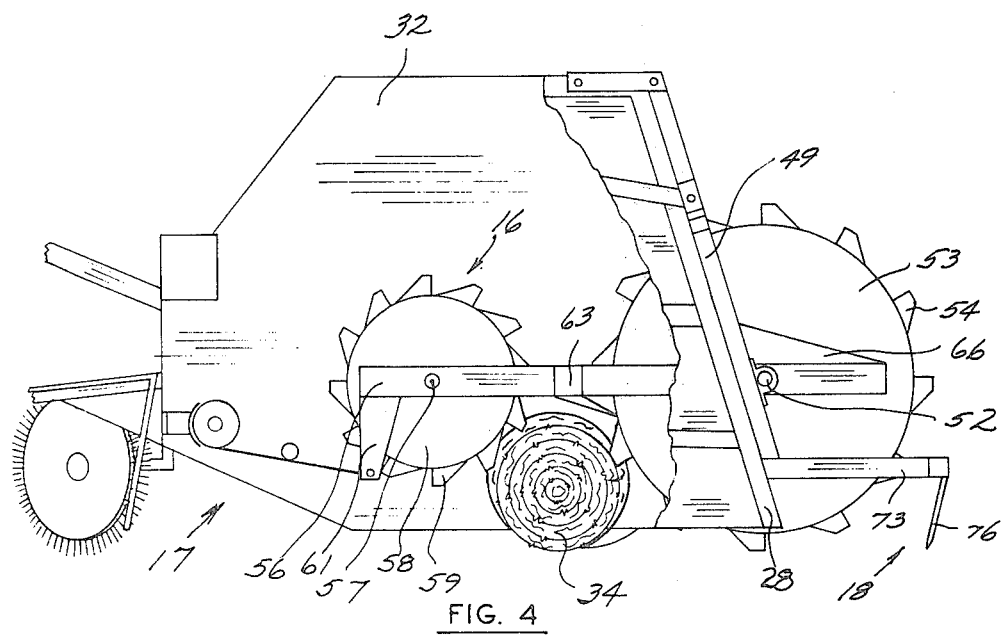
FIG. 4 is a side elevational view with part of the right side removed to disclose the roller and bands as a bale is started.

The round bale forming machine of this invention is depicted generally at 10 in FIG. 1. The baler 10 includes a wheel supported frame 11 having a forward end adapted for attachment to a drawbar of a prime mover (not shown), a lifting arm device 12 pivotally secured to the frame 11, a drum device 13 rotatably mounted on the lifting arm device 12, a cleaning device 14 (FIG. 4) secured to the lifting arm device 12, a roller device 16 pivotally secured to the lifting arm device 12, a band and spring device 17 interconnected between the frame 11 and the roller device, and a comb 18 laterally disposed and mounted to the lifting arm device 12 rearwardly of the drum device.

The frame 11 (FIGS. 1 and 3) includes a V-shaped tow bar 19 having a hitch unit 21 secured to the forward end thereof for attachment to the prime mover or the like.

The frame is substantially identical on both the right and left sides and as only the right side is fully depicted, only that side will be described herein, however, it should be remembered that, unless stated hereinafter, each side has those elements hereinafter described.

Secured to the rear end of the tow bar 19 are parallel, generally horizontally disposed side beams 22. A vertically disposed front beam 23 is secured on one end to the forward end of each side beam 22 and an upper side beam 24 is secured to the top end of each front beam 23 and it is disposed substantially parallel to the side beam 22 disposed therebelow. An angularly inclined upper beam 26 is secured on one end to the top end of the front beam 23, and a generally horizontally disposed top beam 27 is secured at one end to the other end of the upper beam 26. Interconnecting the other ends of the top beam 27, upper side beam 24, and the side beam 22 is an inclined rear beam 28. Also interconnecting the other ends of the right side and left side top beams 27 is a rear lateral beam 29, and interconnecting the one ends of the top beam is a forward lateral beam 31. The latter two beams add rigidity to the overall frame. Each side of the frame has a side wall 32 secured thereto and the area formed between the side walls 32 is identified as a compartment 33 in which a bale 34 (FIG. 4) is formed.

Figure 2:
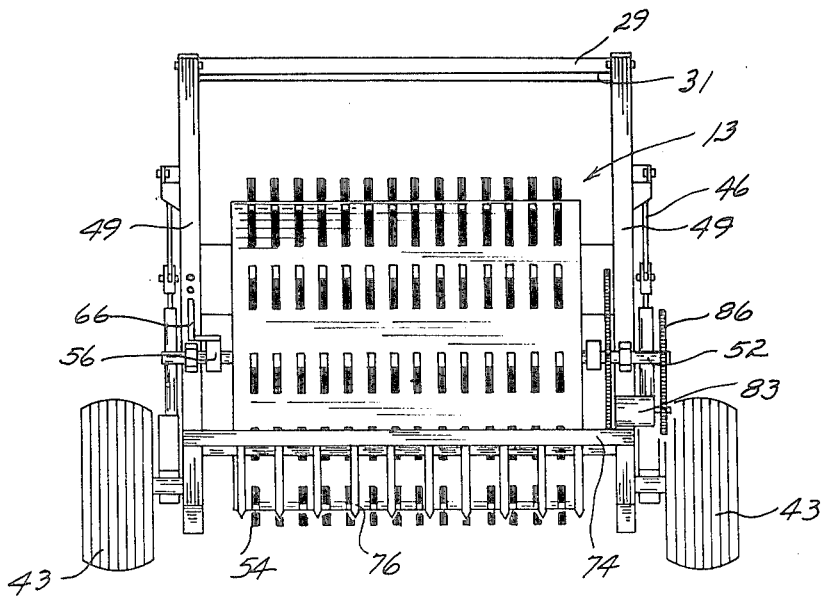
FIG. 2 is a rear elevational view thereof.

Secured to each side beam 22 proximate the mid point thereof is a wheel assembly unit 36 (FIGS. 1 and 2). Each wheel assembly unit 36 is identical; therefore, only one will be described with like reference numbers referring to like parts. The unit includes a flange 37 secured outwardly of and depending from the side beam 22. Pivotally connected to the flange 37 by a pin 38 is a post 39, and extending rearwardly of the post is a journal plate 41. Rotatably mounted on the plate 41 is a stick axle 42 which journally receives a wheel 43. Pivotally secured to the top of the post 39 is one end of an arm 44, the other end of which is pivotally connected to a one corner triangularly shaped link 46. Another corner of the link is pivotally connected to the upper side beam 24. One end of a hydraulic unit 47 is pivotally connected to the link proximate the center thereof and the other end thereof is pivotally connected to the upper side beam 24. Operation of the hydraulic unit 47 causes the link 46 to pivot which in turn causes the post 39 to pivot about the flange thus lowering the wheel 43 to a transport position (FIG. 1).

Pivotally secured to the top beams 27 is the lifting arm device 12 (FIGS. 1 and 6) which includes a pair of L-shaped parallel depending arms 48. Each arm has a short leg 49 pivotally secured on its free end to the top beam 27 inwardly of the other end thereof; and a long leg 49 which lies, in a first position, in juxtaposition against the rear beam 28. A rod 51 is pivotally connected on one end to the long leg 49 intermediate its end and on the other end to a second corner of the link 46. Upon pivoting of the link, the lifting arms are raised for a purpose hereinafter described.

The drum device 13 (FIGS. 2 and 5) includes a drum shaft 52 rotatably mounted between the long legs 49. Mounted on the shaft is a drum 53 having a plurality of radially extending teeth 54 mounted thereon.

Figure 3:
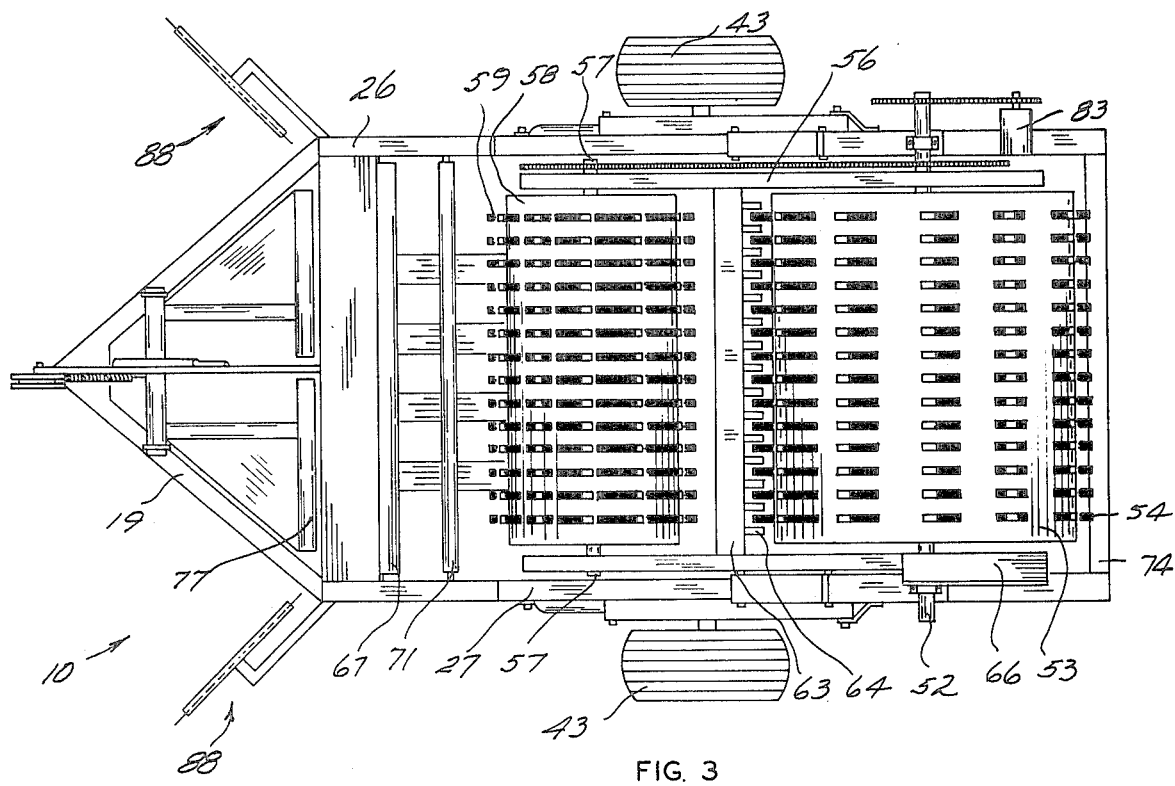
FIG. 3 is a top plan view thereof.
Figure 6:
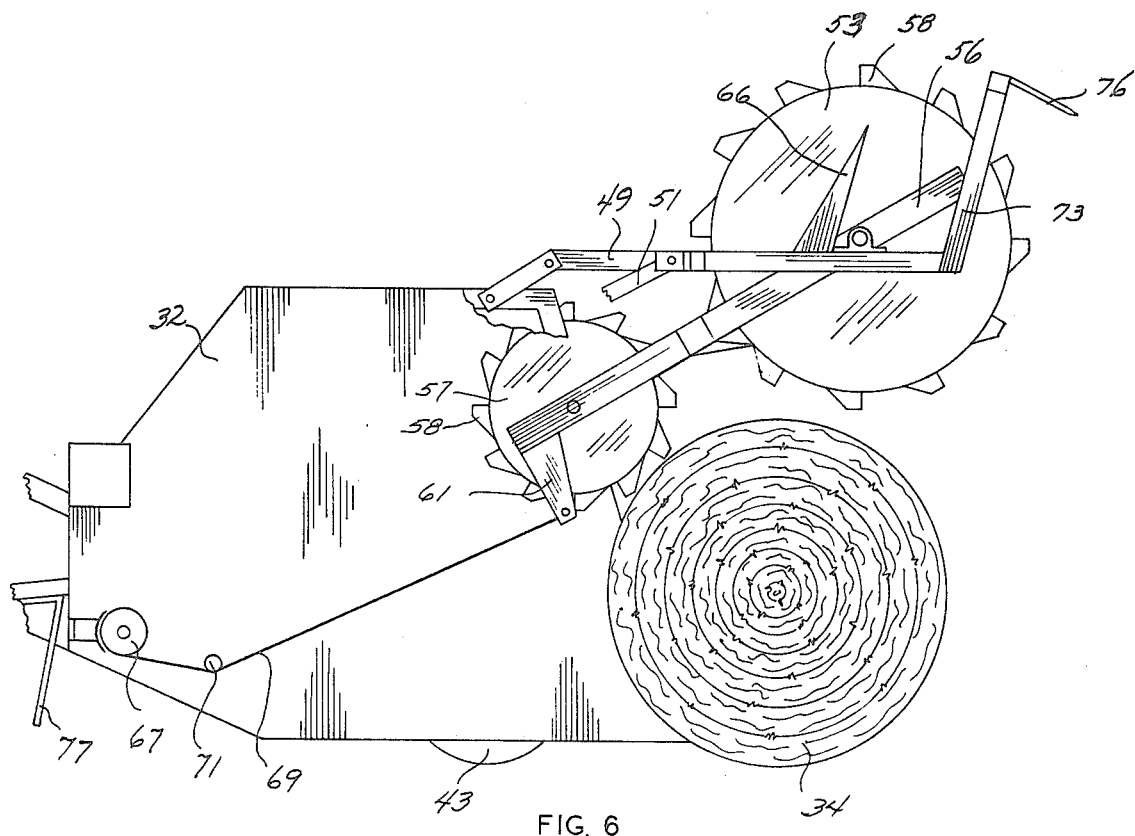
FIG. 6 is a side elevational view with the bale being discharged.

Laterally disposed and pivotally secured between the long legs is the roller device 16 (FIGS. 3 and 6). The roller device includes a pair of parallel beams 56, each pivotally secured on one end to the drum shaft 52, wherein the other end projects forwardly and upwardly of the drum. Proximate the other ends of the beam rotatably mounted to a roller shaft 57 which is parallel to the drum shaft. Mounted on the shaft 57 is a cylindrical roller 58 having a plurality of teeth 59 secured thereto. An arm 61 is secured on one end to the other ends of each beam 56 which projects normally to the beam and generally forwardly thereof. Secured between the free ends of the arms 61 is a rod 62. Mounted between the drum shaft and roller shaft is the cleaning device 14.

Figure 5:
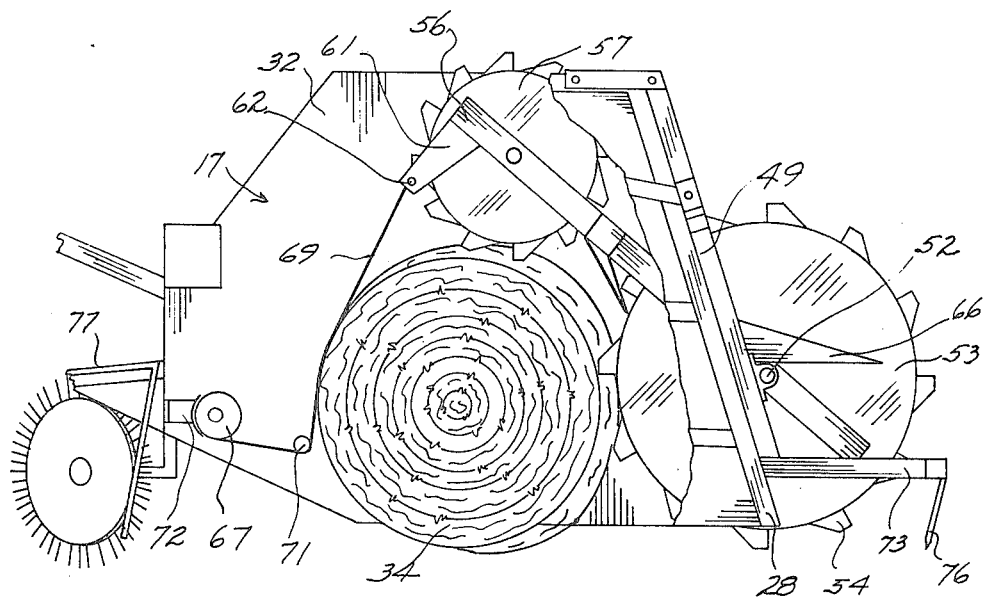
FIG. 5 is a side elevational view similar to FIG. 4 with the bale in substantially a completed form.

The cleaning device 14 (FIGS. 3 and 4) includes a cross beam 63 secured between the two beams 56. Secured to the cross beam and projecting toward the drum 53 are a plurality of arcuate spaced stubs 64, wherein the ends of the stubs 64 are disposed proximate the drum for the purpose of removing any hay adhering thereto. Projecting rearwardly of and secured to the right side long leg 49 is a stop unit 66 (FIGS. 3 and 5). The stop unit 66 is disposed in the plane of the arc through which the beams 56 pivot for the purpose of limiting the arc through which the roller 58 pivots. The roller in a first position (FIG. 4) is disposed just above the ground level with the stop unit controlling that position. The beams can rotate from the first position in a clockwise direction to a discharge position disposed proximate the top of the machine between the top beams 27.

Figure 7:
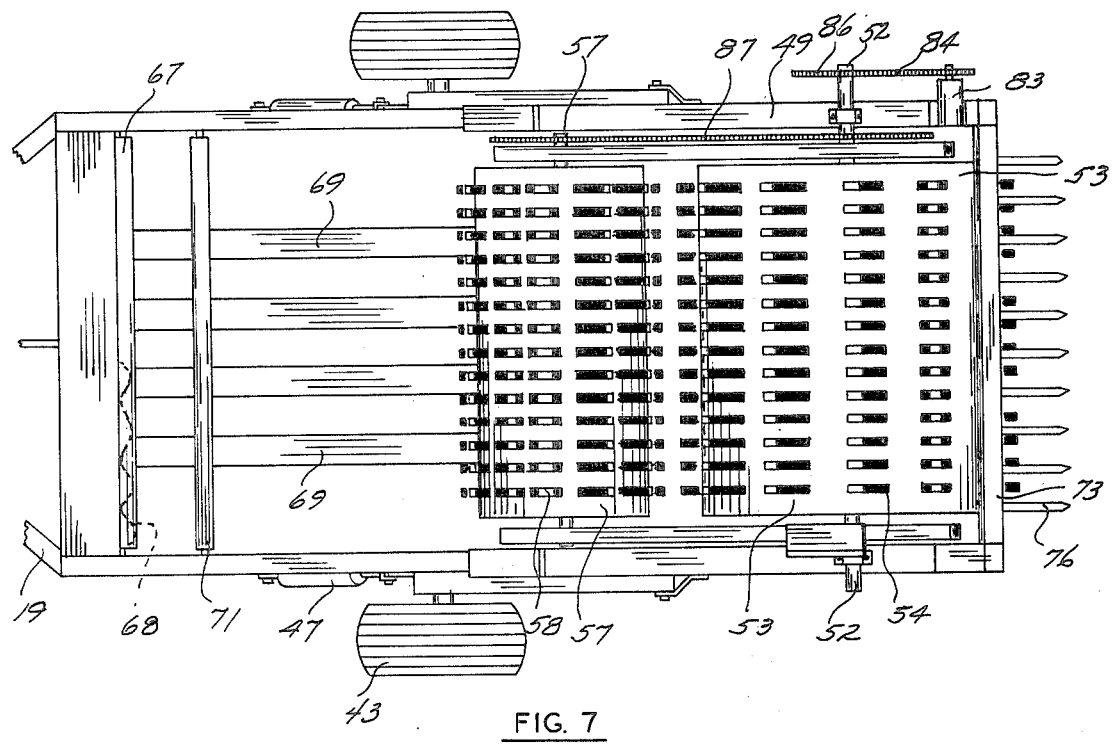
FIG. 7 is a top plan view with the roller and drum in a discharge position.

Secured to the rod 62 (FIGS. 5 and 7) is one end of the band and spring device 17. The band and spring device 17 includes a tube 67 having a spring 68 mounted therein. A plurality of elongated bands 69 are secured on one end to the tube 67 and on the other end to the rod 62. The one end of each band 69 is wrapped around the tube 67 and the spring bias the tube wherein the bands extend generally horizontally to the rod (FIG. 4) when the roller 58 is in the first position. As the roller pivots the bands 69 are unrolled to a second position (FIG. 5). Each band is provided to shape and form the bale and in combination with the spring urge the roller to the first position. A guide rod 71 is disposed between the side walls to position the bands relative to the forming bale. Operably connected to the tube 67 is a brake 72 or restrictor device which is utilized to adjust the bias on the tube as provided by the spring.

A comb 18 (FIGS. 6 and 7) is secured to the bottom end of the long legs 49 and extends transversely therebetween. The comb 18 includes a pair of spaced rearwardly extending bars 73 secured on one end to the long legs 49. Mounted between the free ends of the bars 73 is a transverse beam 74 (FIG. 7) and depending from the beam 74 are a plurality of teeth 76. When the teeth of the drum misses hay in the field, the comb picks up the hay and rolls it between the drum and the comb teeth wherein the drum teeth engage the hay and pulls it under the drum and into the compartment to deposit it on the bale.

Mounted forwardly of the compartment and operably connected to the tow bar 19 is an auxiliary bale forming device 77 (FIGS. 1 and 6). The bale forming device is movable from a first position (FIG. 6) to a second position (FIG. 1). In the first position the device is used to start a second bale while the first bale is being wrapped with twine and/or being discharged from the compartment.

Figure 8:
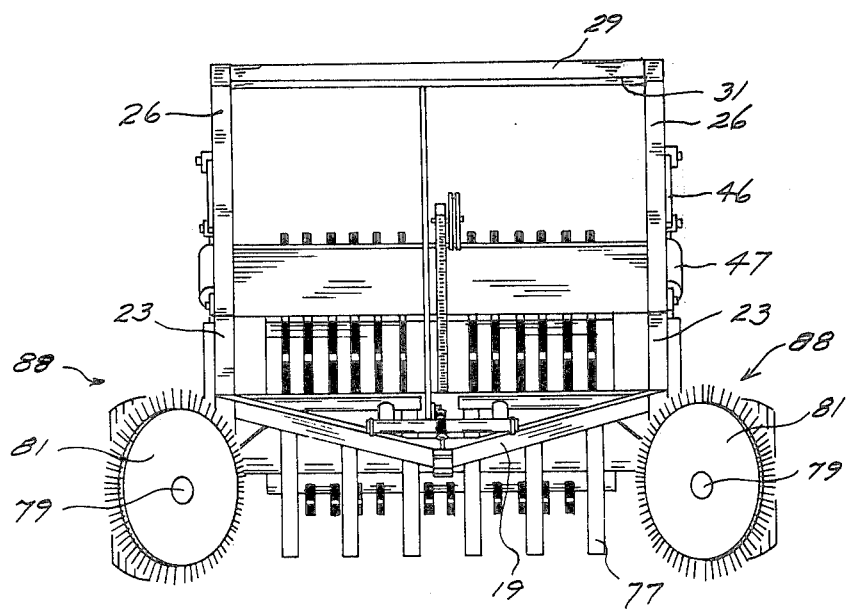
FIG. 8 is a front elevational view.

A power unit 83 (FIG. 7) is mounted on the left long leg 49 and is chain 84 connected to a sprocket wheel 86 on the drum shaft 52. A second sprocket wheel on the drum shaft 52 is chain 87 connected to a sprocket wheel on the roller shaft 57 wherein the peripheral speeds of the drum 53 and roller 58 are substantially identical. It is also possible to power the drum from the wheel 43 either by chain or direct connect wherein the wheel is moved rearwardly to coact with an idler wheel (not shown) on the drum shaft 52. Windrow units 78 are rotatably mounted on the forward end of the frame 11 (FIGS. 3 and 8) and include stub axles 79 angularly disposed to and secured to the frame. Rotatably mounted on each stub axle is a tined wheel 81 which sweeps hay into the path of the drum as the machine moves across a field.

In operation the drum rotating in a clockwise direction picks up hay and the roller substantially correspond to the forward linear speed of the machine thus causing the teeth of the roller and the drum to rotate the bale without tearing it apart.

In the event the operator of the machine desires to form a bale having a compact core, holes 88 are formed in the right long leg 49 proximate the drum shaft 52 to permit the stop unit 66 to be raised thus permitting the roller 58 to be lower in a first position. For a looser core, the stop unit is lowered.

Although only one roller has been depicted, additional rollers and roller units can be added to assist in the forming, shaping and compacting the bale as it is formed. These additional rollers could replace the band and spring unit 17.

I claim:

1. A round bale forming machine for picking up cut hay from a field and forming it into a cylindrical bale, said baler comprising:

portable frame means having a forward end and a rearward end;

upright spaced side walls mounted on said frame;

drum means rotatably mounted on said frame means between said side walls proximate said rearward end, said drum means having pickup means mounted on the periphery thereof for picking up the hay and for rolling the hay into a cylindrical bale and for forming the bale;

roller means disposed forwardly of and parallel to said drum means and rotatably and movably mounted between said side walls for compacting, forming and rolling the bale; and power means connected to said drum to rotate same such that the portion thereof adjacent the ground moves forwardly in the same direction as the baler is moving of the baler with the peripheral speed of said roller substantially equal to the forward speed of the baler.

2. A round bale forming machine as defined in claim 1 wherein said frame means includes a pair of spaced lifting arms pivotally secured thereto and depending therefrom; said drum means includes an axle interconnected between said lifting arms proximate the lower ends thereof and a drum rotatably mounted on said axle; and said roller means includes a pair of spaced elongated members, each pivotally secured proximate one end thereof to said lifting arms and projecting forwardly of said drum, a roller axle interconnected between the other ends of said spaced members, a roller rotatably mounted on said roller axle, wherein as a bale forms, said roller moves from a first position disposed generally forward of said drum through an arc to a second position disposed generally above said drum, and stop means coacting between said arms and said members to prevent said drum from contacting the ground in said first position.

3. A round bale forming machine as defined in claim 2 and including a comb means secured between said members and projecting rearwardly of said drum, said comb means provided to pick up hay missed by said drum and hold it proximate said drum wherein said drum picks up said hay.

4. A round bale forming machine as defined in claim 3 wherein said comb means includes a pair of rearwardly projecting spaced bars, each said bar secured on one end to one of said members, a transverse beam secured between the other end of said bars, and a plurality of spaced depending teeth secured to said transverse beam for sweeping hay from the ground.

5. A round bale forming machine as defined in claim 4 and including windrowing means rotatably mounted on said frame means for sweeping hay into a windrow.

6. A round bale forming machine as defined in claim 3 and including adjustable stop means secured to said frame means proximate said members for limiting the pivotal movement of said members.

7. A round bale forming machine as defined in claim 6 and including a band and spring means interconnected between said roller and said frame means forward end; said band and spring means including a rod interconnected between the ends of said members forwardly of said roller, a generally horizontally disposed tube rotatably mounted between said side walls proximate said frame means forward end, a plurality of elongated spaced bands having one end of each secured to said rod and having the other end wrapped around said tube; and a spring operably connected to said tube to bias said bands on said tube.

8. A round bale forming machine as defined in claim 7 and including a hydraulic means interconnected between said frame means and said lifting arms, said hydraulic means operable to raise and lower said lifting arms.

9. A round bale forming machine as defined in claim 8 and said roller has a plurality of teeth mounted on the periphery thereof to engage the bale, and said power means is generally connected to said roller to provide some with substantially the same peripheral speed as the peripheral speed of said drum.

* * * * *